United States Patent [19]
Rauh et al.

[11] Patent Number: 5,745,252
[45] Date of Patent: Apr. 28, 1998

[54] METHOD AND APPARATUS FOR PRODUCING PHOTOGRAPHIC INDEX PRINTS

[75] Inventors: Hans-Juergen Rauh, StraBlach-Hailafing; Helmut Treiber, Munich; Hans-Georg Schindler, Holzkirchen, all of Germany

[73] Assignee: Agfa-Gevaert Aktiengesellschaft, Leverkusen, Germany

[21] Appl. No.: 931,063

[22] Filed: Sep. 15, 1997

Related U.S. Application Data

[63] Continuation of Ser. No. 441,764, May 16, 1995, abandoned.

[30] Foreign Application Priority Data

May 27, 1994 [DE] Germany ............... 44 18 601.0

[51] Int. Cl.$^6$ ............... H04N 1/23; H04N 1/46; G03B 27/80
[52] U.S. Cl. ............... 358/302; 358/501; 355/38
[58] Field of Search ............... 358/296, 302, 358/401, 448, 501; 355/20, 38, 40, 54, 77

[56] References Cited

U.S. PATENT DOCUMENTS

| | | | |
|---|---|---|---|
| 4,279,502 | 7/1981 | Thurm et al. | 355/38 |
| 4,805,039 | 2/1989 | Otake et al. | 358/335 |
| 4,933,773 | 6/1990 | Shiota et al. | 358/302 |
| 5,072,253 | 12/1991 | Patton | 355/40 |
| 5,124,742 | 6/1992 | Yoshikawa | 355/38 X |
| 5,184,227 | 2/1993 | Foley | 358/302 |
| 5,400,152 | 3/1995 | Manico et al. | 358/501 |
| 5,504,584 | 4/1996 | Jamzadeh et al. | 358/302 |

FOREIGN PATENT DOCUMENTS

| | | |
|---|---|---|
| 0308967 | 3/1989 | European Pat. Off. . |
| 0367879 | 5/1990 | European Pat. Off. . |
| 0629908 | 12/1994 | European Pat. Off. . |
| 5011353 | 1/1993 | Japan . |

*Primary Examiner*—Eric Frahm
*Attorney, Agent, or Firm*—Milde, Hoffberg & Macklin, LLP

[57] ABSTRACT

A method of printing regular photographic prints on a strip of paper along with index prints—that is, prints with images that are smaller than those in the regular prints—from series of negatives on rolls of film. The smaller images are projected next to and one after another along the strip to produce an index print as wide as the strip. The regular prints and the index prints are printed at different points along the strip. The results of area-by-area measurements of the negatives obtained while the regular prints are being printed are exploited to control light quantities while the index prints are being printed. The distance the strip of paper advances from one printing point to the other is regulated to ensure that paper is advanced to the index print printing point once the last negative in a series has been projected onto the strip until the trailing edge of the last print arrives at the margin of the exposure area in the index print printing point. Further printing procedures are discontinued at the regular print printing point until the trailing end of a length of paper that is reserved for the index print associated with that series of negatives, and that must accordingly not be exposed to light, has crossed the edge of the exposure opening near the index print printing point.

20 Claims, 4 Drawing Sheets

METHOD AND APPARATUS FOR PRODUCING PHOTOGRAPHIC INDEX PRINTS

This application is a continuation of application Ser. No. 441,764 filed May. 16, 1995 now abandoned

BACKGROUND OF THE INVENTION

The present invention concerns a method of printing regular photographic prints on a strip of paper along with index prints—that is, prints with images that are smaller than those in the regular prints—from series of negatives on rolls of film, whereby the smaller images are projected next to and one after another along the strip to produce an index print as wide as the strip.

Index prints are prints of all the frames on a single roll of film reduced and printed in rolls and columns on a single sheet of paper of conventional size to provide a rapid overview of the roll's contents and show the position of each frame therein The production of index prints is known from European Application No. 543,233 (and corresponding US Pat. No. 5,184,227) for example. A high resolution scanner scans the content of the film being printed from for the three primary colors. The results are employed to regulate printing light quantity and simultaneously forwarded to another printer that prints the index prints. This procedure demands two printers. Furthermore, assigning the index print to the right film subsequent to printing requires considerable care.

Furthermore, inserting a mirror in a beam of light that has just shone through a film in the printing station of a color printer in order to deflect the light to the lens of a color-video camera is known from European Application 308,967 (and corresponding U.S. Pat. No. 4,933,773). The beam is not filtered, and the video signals are forwarded to an exposure computer for color and shade correction and image construction. The accordingly optimized signals are then stored. When there are enough images in the memory to fill a sheet, a cathode-ray tube projects them thereon by way of another mirror. The overall procedure must accordingly wait for the index prints to be printed and is accordingly time consuming.

SUMMARY OF THE INVENTION

A principal object of the present invention is to eliminate the aforesaid drawbacks in the known systems of producing index prints.

This object, as well as other objects which will become apparent in the discussion that follows, are achieved, in accordance with the present invention by a method wherein the regular prints and the index prints are printed at different points along the strip and wherein the distance the strip of paper advances from one printing point to the other is regulated to ensure that paper is advanced to the index print printing point once the last negative in a series has been projected onto the strip until the trailing edge of the last print arrives at the margin of the exposure area in the index print printing point. Further printing procedures are discontinued at the regular print printing point until the trailing end of a length of paper that is reserved for the index print associated with that series of negatives, and that must accordingly not be exposed to light, has crossed the edge of the exposure opening near the index print printing point.

The present invention allows the index prints to be printed on the same strip of photographic paper as the regular prints. The index prints can even be printed from a number of rolls of film, each accommodating a specific number of negative images, attached together into a long strip in practically the time it would take to print the regular prints alone. Although the number of images on each index print usually equals the number of negative images in each roll of film, in accordance with the present invention the roll can accommodate more images than will entirely occupy the paper. When rolls of film that are shorter than conventional rolls or when only sections of certain rolls are to be printed, the number of images needed to entirely occupy the paper may differ from the number of negative images on the particular roll or section.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
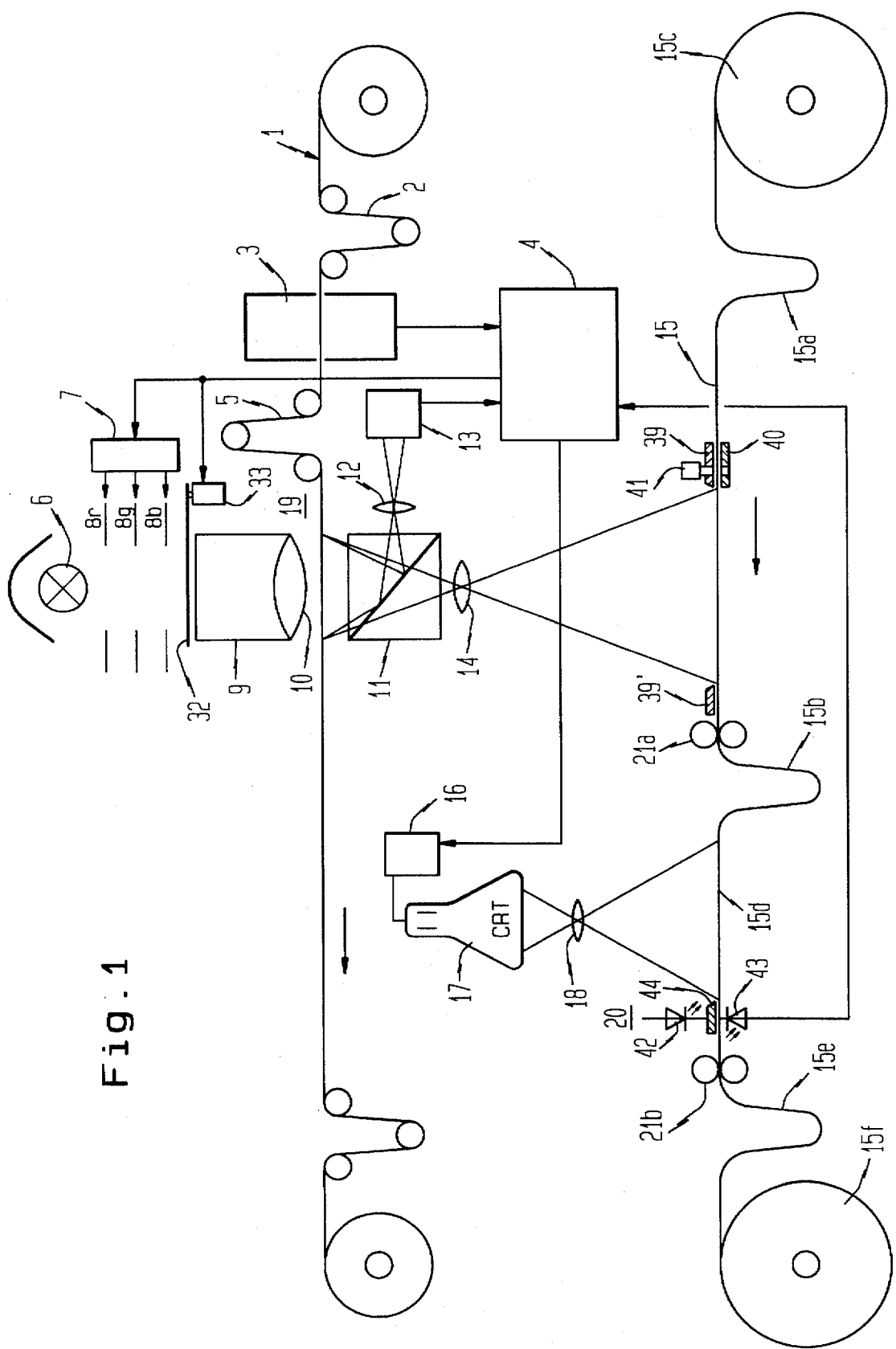
FIG. 1 is a schematic illustration of a device for printing regular prints and index prints on the same roll of paper with a cathode-ray tube for projecting the index print images.

The preferred embodiments of the present invention will now be described with reference to FIGS. 1–4 of the drawings. Identical elements in the various figures are identified with the same reference numerals.

FIG. 1 illustrates a device for producing prints. Series, especially rolls, of negatives are attached together into a long strip 1 and wound on a reel. Strip 1 travels discontinuously through the device, from right to left in the figure, specifically through a buffer 2, a scanner 3, a reservoir 5, and a regular print printing point 19, and winds up on another reel at the opposite end. Scanner 3 conventionally comprises three primary-filtered diodes and detects the presence of each primary color at each point. The results are forwarded to an image-data computer 4. Computer 4 processes the results obtained from a large number of negatives, especially those on a single roll of film, and constructs density-difference curves as disclosed in the German Pat. No. 2,840,287 (and its corresponding U.S. Pat. No. 4,279,503) the contents of which are incorporated herein by reference. A printing-light quantity is calculated for each primary and for each negative in accordance with the density-specific color error. Since no roll should be printed from until all the negatives it contains have been evaluated, the film's arrival at printing point 19 is delayed by a reservoir 5.

Printing point 19 is downstream of reservoir 5, and its structure will now be specified. Light emitted by a source 6 equipped with a reflector shines down through a filtering device 7 and 8, past a shutter 32 operated by magnetic controls 33, and through a mixing chamber 9, a condensing lens 10, and the negative. The light leaving the negative shines on a beam divider 11 in the form of a semitransparent mirror sloping at an angle of 45°. Some of the light is reflected through an objective lens 12 to an image sensor; namely, a CCD camera 13. Some of the light is transmitted through the beam divider 11 and through an objective lens 14 onto a strip 15 of photographic paper maintained flat in the vicinity of the aperture.

Filtering device 7 and 8 comprises a set of controls 7 and a maximum-absorption filter 8 for each primary color. Controls 7 introduce the filters into, and remove them from, the beam in accordance with the results of computer 4 to ensure that the image-significant areas of the negatives will be reproduced color-neutral. Light quantity is controlled by shutter 32 in accordance with the light requirements as determined by computer 4.

The signals emitted by the CCD camera 13 are forwarded to a video-signal memory 16. The capacity of memory 16 is sufficient to accommodate the signals with enough resolution to allow the production of index prints for each series of images, usually all the images on one roll of film. Since the signals are derived from a negative penetrated by a beam that is colored to compensate for its cast, and not by a pure-white beam, they will already be color optimized as they leave the sensor. Total luminosity can also easily be regulated by the instructions issued to controls 33.

The strip 15 of photographic paper leaves its reel 15c and travels through the device, from right to left in the figure and specifically through a reservoir loop 15a, a paper-advance mechanism 21a, another reservoir loop 15b, an index print printing point 20, another paper-advance mechanism 21b, and still another reservoir loop 15e, and winds up on another reel 15f.

Index print printing point 20 is at least the length of one image plus the lengths occupied by second reservoir loop 15b and first paper-advance mechanism 21a downstream of regular print printing point 19.

The visual data stored in memory 16 can be projected onto the strip of paper at index print printing point 20 by almost any graphics device, a laser printer for example. Most preferable, however, is a cathode-ray tube 17. Since there is little demand on resolution, it can even be a commercially available video monitor. Any variations in color due to the characteristics of the tube or the sensitivity of the paper can be taken into account in the signals transmitted to memory 16 by the computer 4. The signals are also stored in memory 16 such that the number of reduced images will be printed in rows and columns that entirely occupy the space intended for them on strip 15d of paper at the magnification dictated by an objective lens 18 at index print printing point 20.

To fully exploit the strip 15 by printing the index print corresponding to each set of negative images precisely next to the last image printed from the previous set, the trailing end of the last image must advance just far enough before the index print is printed to come to rest precisely against the edge of the exposed area in index print printing point 20 that is farther from regular print printing point 19 and perpendicular to the direction of travel. Another criterion that must be adhered to is that a section of the paper strip long enough to accommodate the index prints must be advanced through the copying point without being exposed to light once a set of negatives has been printed.

The computer accordingly determines how long a section of the paper strip will be needed for the index print of each series of negatives being printed from. Paper-advance mechanism 21b then adjusts the loop of paper in the reservoir 15b to a specific length, fully extended for example. The length of paper that will initially have to be advanced by paper-advance mechanisms 21a and 21b to position the trailing edge of the last print printed against the left edge of the exposure area in index print printing point 20 is now known. First paper-advance mechanism 21a now positions the calculated end of the strip that is to be provided with the index print at the edge of the exposure aperture of regular print printing point 19 toward index print printing point 20. The first area of the strip available for the next job is accordingly in the correct position for printing. Exposure of the index print can now commence in index print printing point 20 while the next series of images is being printed in regular print printing point 19. This interplay is repeated for each series of images until strip 1 is exhausted. When there are fewer images and the length of strip needed for the index prints is shorter than the mean distance between printing points 19 and 20, index print printing must be delayed until exposure of the regular prints in the next series allows the free section of the strip to be advanced to index print printing point 20. Since the number of index print is small at that time, printing will be not be decelerated.

The lengths of paper can be monitored more easily in relation to counting the increments of advance if a conventional hole punch is accommodated at the printing point and the holes are detected and exploited to position the strip in index print printing point 20. To accomplish this, a first mask, or face shield mat 39 is arranged along the path of the paper strip 15 at the rear edge (taken in the direction of the paper strip transport) of the image field at the printing point 19. A second face shield mat 39' is arranged on the opposite side of the image field. The mats 39, 39' can be shifted in position in the strip transport direction corresponding to the particular positive image format so that the image field is always limited in the direction transverse to the longitudinal extent of the strip. A hole punch 41 is coupled to the mat 39 as is a bottom die 40 which receives a hole punch plunger. Each time the movement of the paper strip is interrupted— for example, during the light exposure period—a hole is punched by the plunger of the hole punch 41 which passes through a corresponding hole in the mat 39. This hole is punched for each exposure at an unused edge region of the picture which is required in any case for the positioning of the photographic paper strip.

At the forward edge of the image field at the index print printing point 20, there is likewise arranged a mask or face shield mat 44 which limits the exposure of the image field. A light emitting diode 42, coupled to this mat 44, produces light which is received by a photosensor 43 arranged on the opposite side of the strip. These devices are arranged in the path of the holes produced by the hole punch device 40, 41. Whenever a hole passes through the beam of the LED 42 and opens the path for the light to fall on the sensor 43, the movement of the paper strip at the index printing point 20 is interrupted in order to position various image fields in immediately adjacent relationship without overlapping. To accomplish this, the signal produced by the photosensor 43 is supplied to the computer 4 which, in turn, controls the drive of the transport rollers 21b.

How these various operations are coordinated in accordance with the present invention will now be described. Film scanning is initiated when the adhesive joining two successive rolls in strip 1 enters scanner 3 as disclosed in the aforementioned German Pat. No. 2,840,287. The results are processed in succession in the image-data computer 4. The measured negatives are accommodated in reservoir 5. When enough negatives have been measured out for the correct printing data, the first negative in the series is allowed to enter the printing point. Controls 7 position filters 8 in accordance with the image data obtained from computer 4, coloring the light appropriately for the particular negative. Controls 33 open the shutter 32, initiating the exposure of strip 15. A minor component of the light—ten percent (10%) for example—is simultaneously deflected by beam divider 11 to camera 13, which immediately detects color-corrected luminosities for each primary color. The luminosities are corrected by the computer 4 in accordance with the characteristics of cathode-ray tube 17, the sensitivity of the paper, and the overall light quantity, and the results, supplied to memory 16, are displayed on the screen in rows and columns of the right dimension for projection onto the strip 15. This occurs when adhesive is detected and the last negative in a series is advanced out of regular print printing point 19. Paper-advance mechanisms 21a and 21b now advance strip 15 the distance between the two printing points plus the length of one image as hereintofore specified. Once the strip has been advanced the correct length for the desired index prints to the left-hand edge of the image window in regular print printing point 19, printing from the next series of negatives can commence.

The exposed strip is then developed. The prints will be high-quality and will occupy the full width of the strip. The index prints projected onto the strip after the series of regular prints will be optimally color and density corrected and can be supplied directly with the order.

Figure 2:
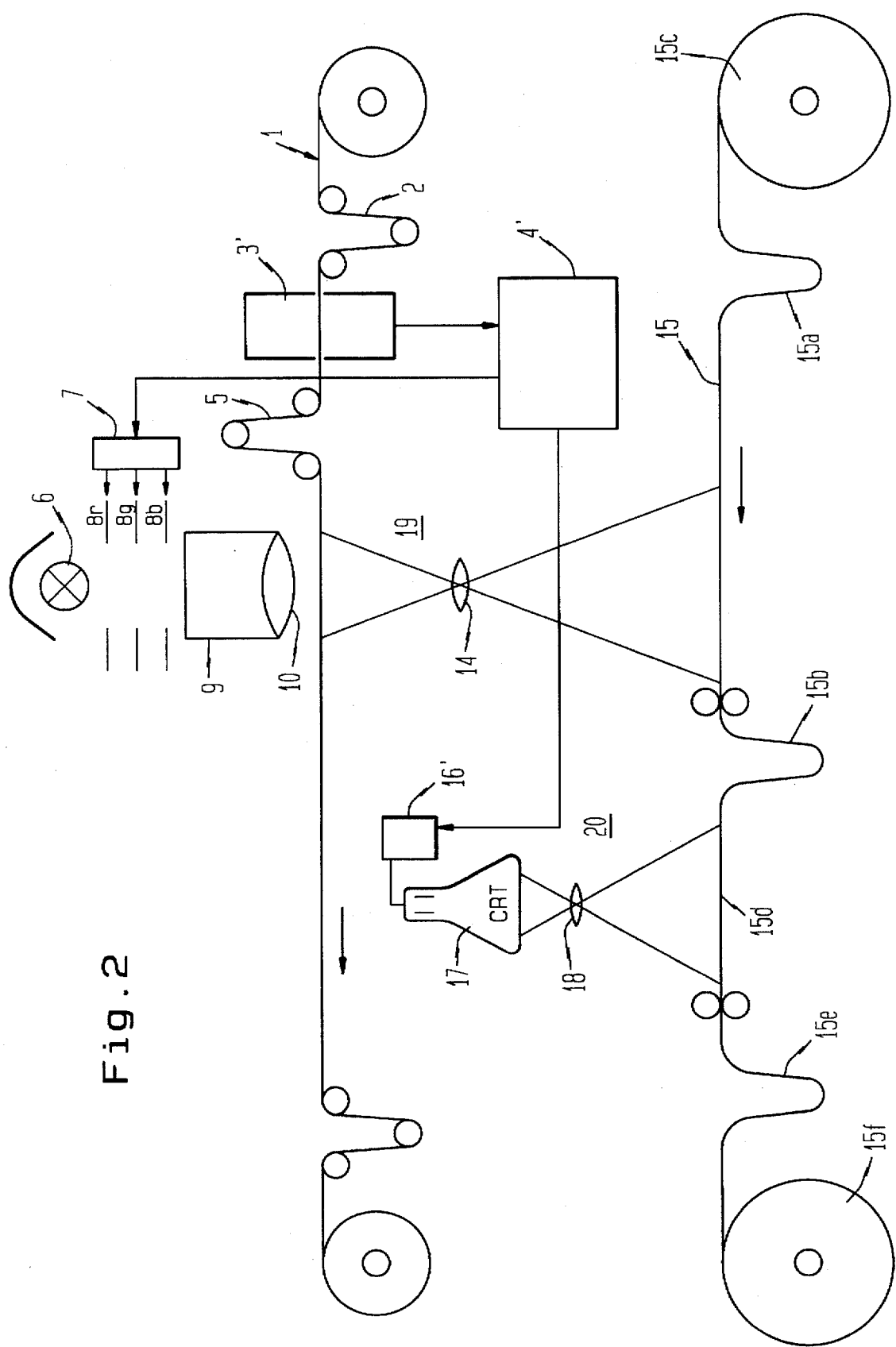
FIG. 2 is a schematic illustration of a version of the device shown in FIG. 1 with a high resolution scanner for intercepting visual signals.

The scanner 3' in the device illustrated in FIG. 2 is, in contrast to the scanner illustrated in FIG. 1, high-resolution and can accordingly directly provide the visual signals for the index prints. They are on the other hand not color-corrected and the light quantities determined from the scanning results can also be employed in the primaries to correct the visual-signal values for producing the index prints. The scanner is accordingly much more high-resolution, as is necessary for obtaining the signals. The image-data computer 4' and memory 16' in the present embodiment are also somewhat different due to the difference in data. Regular print printing point 19 and index print printing point 20, however, including the paper-advance mechanisms, are identical to those in the embodiment illustrated in FIG. 1 and will not be further specified herein.

Figure 3:
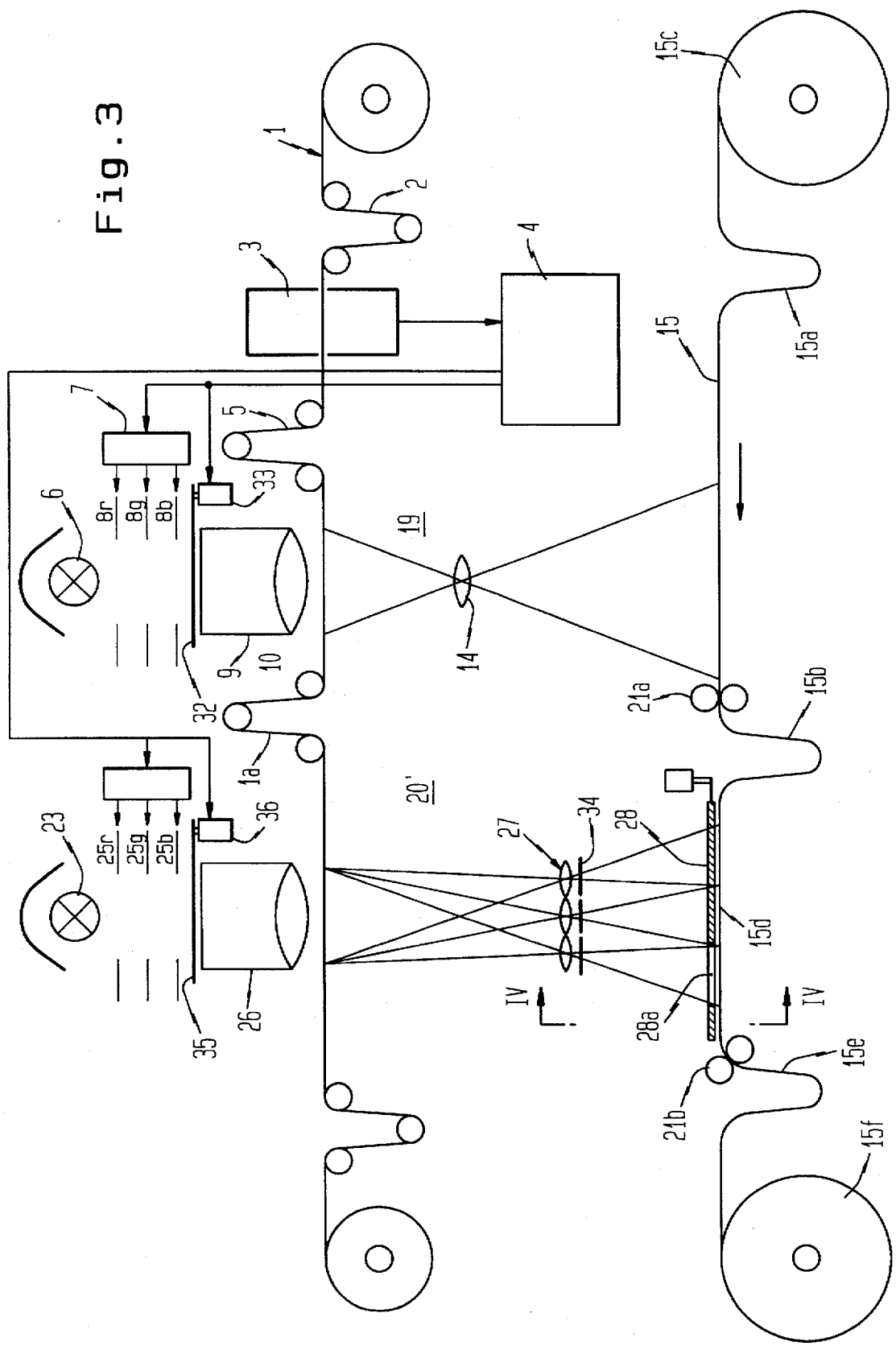
FIG. 3 is a schematic illustration of a device for projecting regular size and index print images on the same strip of paper by integral printing of the index print.

The regular print printing point 19 in the device illustrated in FIG. 3 is, with the exception of the resolution of scanner 3, identical in design and function with the regular print printing point 19 illustrated in FIG. 2. The scanner's resolution, however, is appropriate only for limited scanning of the negatives at 100 to 400 test points, which is enough for calculating the visual data.

The index print printing point 20' employed in this embodiment, however, is different. Printing point 20' has a housing that accommodates a source of light in the form of a lamp 23. The printing point also includes filter controls 24 and filters 25r, 25g, and 25b essentially similar to those in regular print printing point 19. It also includes a light-mixing chamber 26 above the exposure surface like the light-mixing chamber 9 in regular print printing point 19. The device that prints the individual index print images, however, is designed to project them in order and at the correct size and location (with respect to rows and columns), onto the section of strip 15 in the exposure area. One objective lens 27 for each image in the index print is accordingly positioned at an appropriate level and operates in conjunction with a separately controlled auxiliary shutter 34. There is also a main shutter 35 for each index print, operated by magnetic controls 36, in the beam. Main shutter 35 satisfies every demand with respect to speed and precision, so that auxiliary shutters 34 can be more cost-effective, i.e., less expensive. For three images in a row and three images in a column for example there will be a grid of nine objective lenses 27, projecting nine negatives introduced one after another into the beam of light, the first with the lens at the front left edge, the second with the lens at the middle of that row, and the third with the lens on the right of the forward row, onto the appropriate area of strip 15. Interference from scattered light can be prevented with a mask 28 with an exposure opening 28a of the correct size. An appropriate mechanism introduces the opening into the beam of light deriving from the objective lens 27 that is being briefly activated by shutters 34 and 35. Computer 4 has a larger capacity for image data and stores the data in each series of negatives by way of an initial printing process in regular print printing point 19 and, always in association with the negative in index print printing point 20, adjusts the color filter to the value of the filter in regular print printing point 19 by way of filter controls 24.

An important component of the operation is a film reservoir 1a arranged between the two printing points and having enough capacity to accommodate at least the maximal series of negatives.

The regular print printing point 19 in this embodiment operates like the printing point in FIGS. 1 and 2. A series of negatives is advanced to scanner 3. The light quantity for each primary color in each negative is detected and stored. These calculations cannot be carried out until at least several of the negatives in a series have been processed and introduced into the reservoir 5. The image data are then forwarded, always in association with the negatives in regular print printing point 19, to controls 7 and to shutter 32 and controls 33, resulting in an optimized print. The negative that has been printed from, however, is not released for winding up, but is initially advanced to reservoir 1a. Once this series of negatives has been copied, as indicated by the transition of the adhesive for instance, the length of paper needed for the index print is calculated, and the corresponding unexposed area of paper is advanced with its initial section into paper-intercepting mechanism in index print printing point 20. The first negative in the series is simultaneously advanced into the printing window in index print printing point 20'. The filter 25 for that negative is introduced on the basis of the printing data still stored in computer 4. The negative is then printed from in the corner position on the strip of paper by means of the auxiliary shutter 34 associated with first objective lens 27 and main shutter 35 and its magnetic controls 36. The filters, negative-advance mechanisms, and scatter-prevention mask, and the auxiliary shutter 34 associated with the next objective lens 27 must be actuated again for the next print. The first part of nine negatives in a series is accordingly printed onto one image area and paper-advance mechanism 21b is actuated again.

Further simplification can be achieved with only one row of objective lenses 27 distributed across the strip such that only part of an index print, three adjacent reduced images for example, is exposed, subsequent to which strip 15 is advanced a third of an image length. It is, finally, also conceivable to displace this row of lenses into the three objective-lens positions illustrated in FIG. 3. In this technique of integral illumination of one negative at a time in another subsidiary area of the paper intended for the index print, only very small areas are illuminated, and exposures are also very short. Lamp 23 can also be less bright for example without decreasing the output of regular print printing point 19. Since it can be generally assumed that the series of negatives will all be of approximately the same size, reservoir 1a will be able to compensate by ensuring that printing points 19 and 20 always operate essentially in parallel.

Figure 4:
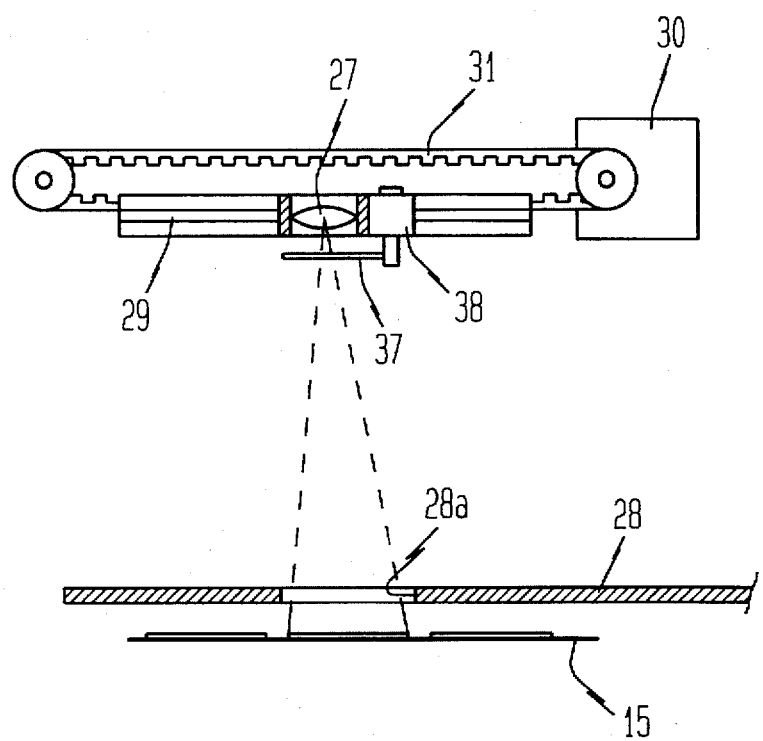
FIG. 4 is a schematic illustration of a version of the device shown in FIG. 3 with a single lens that can be displaced into various positions.

A particularly simple embodiment of integral exposure of the negatives in a single series at an index print printing point 21 is illustrated in FIG. 4. In this embodiment only one objective lens 27 is mounted on a traveling holder along with a single shutter 37 and its drive mechanism 38. The holder travels back and forth across the strip of paper along a track 29 powered by a stepping motor 30 and an associated transmission and a cogged belt 31, for example. The stepping motor is controlled by the computer 4. In this embodiment, negatives are projected one after another by one and the same objective lens 27 onto adjacent areas of strip 15 until the mechanisms have advanced the paper part of an image length, initiating the next index print row.

The embodiment of the present invention illustrated in FIG. 4 also makes it possible for the objective lens 27 to be a zoom lens, allowing negatives of different dimensions to be projected onto strip 15. The motor 30 can be regulated to position the objective lens 27 at various positions. It will accordingly become possible by instructions alone to project different numbers of index prints onto strips 15 of different width. Four index print images one inch wide each can be printed on a strip that is four inches wide and three images one inch wide on a strip that is three inches wide. Fixed objective lenses 27 with different focal intercepts can alternatively be employed instead of zoom lenses and replaced, as necessary, although this approach is not as convenient.

Finally, the scanner 3 in the embodiment of the invention illustrated in FIGS. 1 and 2 can read image numbers printed in a barcode on the edge of the film and use graphics software to store the numbers alphanumerically in the computer and project them from the cathode-ray tube onto the paper next to the index prints. An image number exposed in cleartext at the edge of the film can be integrally reproduced next to the index print in the device illustrated in FIG. 3.

There has thus been shown and described a novel method and apparatus for producing photographic index prints which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a method of printing regular photographic prints on a strip of photographic paper, along with index prints, having images that are smaller than those in the regular prints, from series of negatives on film, whereby the smaller images are projected next to and one after another along the strip of photographic paper to produce an index print as wide as the strip of photographic paper, the improvement comprising the steps of printing the regular prints and the index prints at different printing points along the path of movement of the strip of photographic paper; regulating the distance the strip of paper advances from one printing point to the other to ensure that the strip of photographic paper is advanced to the index print printing point once the last negative in a series has been projected onto the strip of photographic paper until the trailing edge of the last print arrives at the margin of the exposure area in the index print printing point; determining the length of the strip of photographic paper required for printing index prints and interrupting the printing procedure at the regular print printing point until the trailing end of the length of the strip of photographic paper that is reserved for the index prints associated with that series of negatives and that must accordingly not be exposed to light has crossed the edge of the exposure opening of the regular print printing point nearest the index print printing point.

2. The method defined in claim 1, wherein the increments advanced by the paper are counted for the purpose of regulating the distance the strip advances.

3. The method defined in claim 1, further comprising the steps of imparting marks to the strip at the regular print printing point and sensing the marks at the index print printing point to position the sections of paper that must not be exposed to light, in order to facilitate regulating the distance the strip advances.

4. The method defined in claim 1, wherein the strip is passed through a variable-length reservoir loop and, for reliable association of the sections of the strip of paper that must not be exposed to light with index print exposure, the method further comprises the step of prescribing a specific loop length equal to the length the strip is to be advanced prior to the commencement of strip advancement.

5. The method defined in claim 1, wherein area-by-area measurements of the negatives are performed while the regular prints are being printed and the results of such measurements are used to determine light quantities while the index prints are being printed.

6. The method defined in claim 5, wherein at least one of the color and quantity of the light that penetrates the negatives at the regular print printing point are corrected in accordance with the area-by-area measurement of the particular negative, wherein a sequence of video signals is generated by an image sensor on the other side of the negative from the light source and stored in a memory, and wherein the stored video signals obtained from the preceding mutually associated negatives are projected in reduced size onto the strip of paper at the index print printing point downstream of the regular print printing point.

7. The method defined in claim 6, wherein the negatives are scanned in high resolution by a color scanner upstream of the regular print printing point, wherein the scanning results are used both to calculate the light quantities necessary for printing and to correct these video signals in accordance with the calculated light quantities and stored in a memory, and wherein the images stored in the form of video signals are projected at the desired size next to and one after another onto the section of the strip following the section that the negatives themselves are projected onto.

8. Apparatus for carrying out the method recited in claim 7, comprising a color, high-resolution, negative image scanner, upstream of the regular print printing point, coupled to an exposure computer and to a memory, said memory storing the scanner output signals corrected in accordance with the detected light needed at the regular print printing point for exposure at the index print printing point.

9. Apparatus for carrying out the method recited in claim 6, wherein, at the index print printing point, the images stored in the memory in the form of video signals are projected at the desired size next to and one after another onto the section of the strip following the section that the negatives themselves are projected onto.

10. The apparatus defined in claim 9, wherein the images are projected by a cathode-ray tube printer.

11. The apparatus defined in claim 9, wherein the images are projected by a color laser printer.

12. The apparatus defined in claims 9, comprising a paper-strip reservoir loop between the regular print printing point and the index print printing point that absorbs approximately all the paper that arrives while the index prints are being printed.

13. The method defined in claim 1, wherein the print data from the mutually associated sets of negatives are stored throughout a preliminary printing process in association with the negatives, wherein the negatives are projected onto the strip of paper one after another, next to one another, and one behind another in a multiple-print printing device adjacent to the regular print printing point by an exposure device with variable light quantity, and wherein the negatives in the next series are stored upstream of the printing point at least until the conclusion of the multiple-print printing.

14. Apparatus for carrying out the method recited in claim 13, comprising a negative image scanner, an exposure computer coupled thereto for calculating and storing printing data in association with the scanned negatives, a printing device, coupled to the computer, for printing regular prints while controlling the light quantities in the primary colors in accordance with the stored printing data, and a device for printing index prints, wherein the device for printing the index prints comprises a multiple-exposure device for each negative and is positioned away from the regular print printing point along the path traveled by the strip of paper and a lamp housing above the negative-supporting surface at the index print printing point that applies to the negative the light quantities calculated for the particular negative through at least one of a plurality of color filters that control intensity and time-controlled subtractive filters of maximal density.

15. The apparatus defined in claim 14, wherein the index print printing point comprises at least one row of objective lenses, one lens for each of the reduced images to be projected across the paper, with a light shutter associated with each lens, and means for opening and closing the shutters individually and sequentially.

16. The apparatus defined in claim 15, comprising a row of objective lenses extending across the direction the negatives are advanced along, means for displacing the lens row the length of one projected index print at a time, or for advancing the strip of paper the length of one index print, subsequent to the exposure of a row of index prints.

17. The apparatus as in claim 14, comprising a single objective lens mounted on a displacement device that is driven by a stepping motor at the index print printing point, said apparatus being operative to displace the lens the width of one image after every printing procedure, restore the lens to its original position and advance the strip of paper the length of one index print at the end of every row.

18. The apparatus defined in claim 17, wherein the objective lens has at least one of a variable focal intercept and a plurality of interchangeable lenses with different focal intercepts and further comprising means for coordinating movement of the displacement device and the paper strip-advance mechanism.

19. The apparatus defined in claim 14, further comprising a displaceable scattered-light mask disposed over the strip of paper with an exposure opening the same size as the image and means for forwarding the mask along with the position of the paper strip area that is exposed to light.

20. Photographic printing apparatus for printing regular photographic prints on a strip of photographic paper from a series of negatives on film at a first printing point, and for printing index prints on the strip of photographic paper, said index prints having images that are smaller than those in the regular prints, whereby the smaller images are projected next to and one after another along the strip of photographic paper to produce an index print as wide as the strip of photographic paper, said apparatus including a color scanner that measures the negatives area-by-area, an exposure computer that optimizes the color of the light employed for exposure in the first printing point, and an image camera that detects the color-optimized video signals in a video beam deflected out of the printing beam, the improvement comprising a second printing point, disposed next to and displaced from said first printing point along the path of travel of the strip of photographic paper, for printing the index prints on the strip of photographic paper; a counter for counting the negatives in the series and a computer for calculating the length of the strip of photographic paper that will be needed for the index prints for that series; wherein variable paper-advance mechanisms are positioned along the strip of photographic paper each at the end of the first and second printing points; wherein the paper-advance mechanism in the first printing point advances the sections of the strip of photographic paper that must be reserved for the index prints through the exposure opening at that point and wherein the paper-advance mechanism in the second printing point advances the strip of photographic paper until the trailing edge of the last print to be exposed reaches the outer margin of the exposed area of the second printing point perpendicular to the direction of movement of the strip of photographic paper.

* * * * *